United States Patent
Fahrer

(10) Patent No.: US 9,415,621 B2
(45) Date of Patent: Aug. 16, 2016

(54) INTERACTIVE BOOK WITH INTEGRATED ELECTRONIC DEVICE

(71) Applicant: David Fahrer, New York, NY (US)

(72) Inventor: David Fahrer, New York, NY (US)

(73) Assignee: Little Magic Books, LLC, New York, NY (US)

( * ) Notice: Subject to any disclaimer, the term of this patent is extended or adjusted under 35 U.S.C. 154(b) by 145 days.

(21) Appl. No.: 14/180,044

(22) Filed: Feb. 13, 2014

(65) Prior Publication Data

US 2014/0313186 A1    Oct. 23, 2014

Related U.S. Application Data

(60) Provisional application No. 61/766,653, filed on Feb. 19, 2013.

(51) Int. Cl.
*G06F 17/00* (2006.01)
*G06T 1/00* (2006.01)
(Continued)

(52) U.S. Cl.
CPC .. *B42D 3/00* (2013.01); *G09B 5/02* (2013.01); *G09B 5/062* (2013.01)

(58) Field of Classification Search
CPC .......... B42D 3/00; B42D 3/123; B42D 1/007; B42D 15/00; B42D 3/12; B42D 12/00; B42D 1/006; B42D 1/009; B42D 1/08; G09B 5/02; G09B 5/062; G09B 5/00; G09B 5/06; G09B 17/003; G09B 19/00; G09B 5/10; G09B 5/12; G09B 17/04; G09B 19/06; G09B 21/008; G09B 21/02; G09B 5/04; G09B 5/065; G09B 5/08; G09B 5/14; G09B 7/02; G09B 7/04; G09B 5/067; G09F 9/00; G09F 3/0483; G09F 15/0283; G09F 15/025; G09F 15/0291; G09F 17/21; G09F 17/212; G09F 17/217; G09F 17/2264; G09F 17/24; G09F 17/248; G09F 17/2863; G09F 17/30017; G09F 1/1616; G09F 1/1635; G09F 1/1647; G09F 1/1652; G09F 2203/04806; G09F 2203/04808; G09F 3/044; G09F 3/0485; G09F 3/1423; G09F 3/147; G09F 17/30554; G09F 3/0224; G09F 3/0238; G09F 3/0463; G06T 11/60; G06T 7/0044; G06T 2207/30204; G06T 19/006; G06T 3/0031; Y10S 345/901; G09G 2380/02; G09G 2380/14; G09G 3/344; G09G 3/20; G09G 2300/08; G09G 2310/0218; G09G 2310/0267; G09G 2310/0275; G09G 2310/0281; G09G 2330/021; G09G 2340/02; G09G 2340/12; G09G 2340/14; G09G 2360/121; G09G 2360/144; G09G 2370/027; G09G 5/003; G09G 5/12; G06Q 30/02; G06Q 30/0201; G06Q 10/00; G06Q 10/06375; G06Q 10/101; G06Q 30/0237; G06Q 30/0254; G06Q 30/0259; G06Q 30/0267; G06Q 30/0272; G06Q 30/0277; G06Q 30/0601; G06Q 50/01; A63H 19/00; A63H 33/38; A63H 2200/00; A63H 30/00; B42P 2221/00; G02B 2027/014; G02B 27/017; G02F 1/133305; G02F 1/13452; G02F 1/1368; G06K 17/0022; G06K 19/0717; G06K 19/0723; G06K 19/07327; G06K 17/00; G06K 7/081; H04N 1/387; H04N 21/258; H04N 21/25891; H04N 21/44222; H04N 1/00127; H04N 1/00392; H04N 1/00827; H04N 2201/0084; H04N 2201/0434; H04N 21/414; H04N 21/812; H04N 21/6125; H05K 3/10; H05K 1/0386; H05K 3/12; A45C 15/00; A45C 11/16

See application file for complete search history.

(56) References Cited

U.S. PATENT DOCUMENTS 4,681,548 A * 7/1987 Lemelson ................ G09B 7/06
                                                                 434/308
4,855,725 A * 8/1989 Fernandez .............. G06F 3/147
                                                                 345/173

(Continued)

OTHER PUBLICATIONS

Yau, WIPO publication No. 201110077, 2011.*

(Continued)

*Primary Examiner* — Phi Hoang
*Assistant Examiner* — Charles L Beard
(74) *Attorney, Agent, or Firm* — Martensen IP

(57) ABSTRACT

A system for the integration of print and electronic media includes an electronic media device having a display operable to render an image and a paged media collection wherein several pages of the collection have an open area void of material. This open area is aligned with the display of the electronic device so as to integrate content presented on the printed pages with synchronized content rendered on the display of the electronic device.

25 Claims, 6 Drawing Sheets

(51) Int. Cl.
*B42D 3/00* (2006.01)
*G09B 5/02* (2006.01)
*G09B 5/06* (2006.01)

(56) References Cited

U.S. PATENT DOCUMENTS

| | | | | |
|---|---|---|---|---|
| 4,879,557 A * | 11/1989 | Roche | G06F 3/0238 | 250/221 |
| 4,884,974 A * | 12/1989 | DeSmet | G09B 17/006 | 281/15.1 |
| 5,167,508 A * | 12/1992 | Mc Taggart | B42D 1/006 | 362/98 |
| 5,466,158 A * | 11/1995 | Smith, III | A63F 9/183 | 273/236 |
| 5,485,176 A * | 1/1996 | Ohara | G09B 5/062 | 345/156 |
| 5,517,407 A * | 5/1996 | Weiner | G06F 15/0283 | 704/1 |
| 5,520,544 A * | 5/1996 | Manico | G09B 5/062 | 281/31 |
| 5,534,888 A * | 7/1996 | Lebby | G06F 1/1616 | 345/672 |
| 5,636,995 A * | 6/1997 | Sharpe, III | G09B 5/062 | 434/169 |
| 5,707,240 A * | 1/1998 | Haas | G09B 5/062 | 434/308 |
| 5,865,677 A * | 2/1999 | Goldfarb | G09B 5/062 | 434/327 |
| 5,897,324 A * | 4/1999 | Tan | G09B 5/062 | 345/901 |
| 5,921,582 A * | 7/1999 | Gusack | B42D 12/00 | 283/36 |
| 6,064,855 A * | 5/2000 | Ho | G09B 5/062 | 345/901 |
| 6,072,980 A * | 6/2000 | Manico | G09B 5/062 | 281/31 |
| D437,612 S * | 2/2001 | Verdicchio | D19/26 | |
| 6,201,947 B1 * | 3/2001 | Hur | G09B 5/062 | 345/901 |
| 6,314,474 B1 * | 11/2001 | Walter | G06F 15/0283 | 709/201 |
| 6,416,326 B1 * | 7/2002 | Oh | G09B 5/06 | 434/178 |
| 6,516,181 B1 * | 2/2003 | Kirwan | G09B 5/062 | 434/169 |
| 6,525,706 B1 * | 2/2003 | Rehkemper | G09B 5/06 | 345/87 |
| 6,729,543 B1 * | 5/2004 | Arons | G06F 17/30017 | 235/462.01 |
| 6,763,995 B1 * | 7/2004 | Song | G06F 3/0224 | 235/375 |
| D494,166 S * | 8/2004 | Kumagai | D14/345 | |
| 6,788,283 B1 * | 9/2004 | Blotky | G06F 15/0283 | 345/156 |
| 6,915,103 B2 * | 7/2005 | Blume | G06F 3/03545 | 345/173 |
| 7,081,885 B2 * | 7/2006 | Blume | G09B 21/006 | 178/18.03 |
| 7,110,945 B2 * | 9/2006 | Cogliano | G09B 19/04 | 704/235 |
| 7,139,523 B1 * | 11/2006 | Lynch | G06F 3/0224 | 434/317 |
| 7,196,689 B2 * | 3/2007 | Moriyama | G06F 3/0483 | 345/156 |
| 7,224,934 B2 * | 5/2007 | Mullen | B42D 1/007 | 345/901 |
| 7,402,042 B2 * | 7/2008 | Kelley | G09B 17/006 | 434/156 |
| 7,941,090 B2 * | 5/2011 | Small | G09B 17/003 | 434/317 |
| 7,959,086 B2 * | 6/2011 | Mattlin | G06Q 30/0201 | 235/487 |
| 8,011,122 B2 * | 9/2011 | Clegg | B42D 15/022 | 40/124.03 |
| D646,659 S * | 10/2011 | Liberatore | D14/132 | |
| D654,113 S * | 2/2012 | Clegg | D19/1 | |
| 8,135,606 B2 * | 3/2012 | Dupree | G06Q 30/02 | 705/7.29 |
| 8,181,848 B2 * | 5/2012 | Olmsted | G06K 19/07327 | 235/375 |
| 8,300,022 B2 * | 10/2012 | Brenneman | G06F 1/1616 | 345/1.1 |
| D680,170 S * | 4/2013 | Benadon | D19/26 | |
| D684,626 S * | 6/2013 | Lam | D19/26 | |
| 8,484,027 B1 * | 7/2013 | Murphy | G09B 5/06 | 704/258 |
| 8,503,857 B2 * | 8/2013 | Sikorski | H04N 5/765 | 386/224 |
| D691,653 S * | 10/2013 | Benadon | D19/26 | |
| 8,594,557 B2 * | 11/2013 | Taylor | G09B 5/02 | 434/308 |
| 8,825,121 B2 * | 9/2014 | Aoki | G06F 1/1616 | 361/679.56 |
| 8,849,182 B2 * | 9/2014 | Neuhauser | B42D 15/00 | 434/308 |
| 8,960,936 B1 * | 2/2015 | Malcolm | B42D 3/123 | 345/901 |
| 2001/0040560 A1 * | 11/2001 | Amron | G06F 1/1626 | 345/169 |
| 2003/0116620 A1 * | 6/2003 | Song | G06F 3/0224 | 235/375 |
| 2004/0025034 A1 * | 2/2004 | Alessi | G06Q 30/0237 | 713/189 |
| 2005/0053906 A1 * | 3/2005 | Kim | G09B 5/062 | 434/317 |
| 2005/0186547 A1 * | 8/2005 | Yang | G09B 5/062 | 434/308 |
| 2005/0260551 A1 * | 11/2005 | Rubin | G09B 5/062 | 434/317 |
| 2005/0268798 A1 * | 12/2005 | Neuhauser | B42D 15/00 | 101/72 |
| 2006/0194181 A1 * | 8/2006 | Rosenberg | G09B 5/06 | 434/317 |
| 2007/0011011 A1 * | 1/2007 | Cogliano | G09B 19/04 | 704/272 |
| 2007/0111177 A1 * | 5/2007 | Rifkin | G09B 5/062 | 434/317 |
| 2007/0154876 A1 * | 7/2007 | Harrison | G09B 5/06 | 434/365 |
| 2007/0187942 A1 * | 8/2007 | Yau | B42D 3/123 | 281/29 |
| 2007/0199851 A1 * | 8/2007 | Yau | B42D 3/123 | 206/472 |
| 2008/0032275 A1 * | 2/2008 | Zheng | G09B 5/062 | 434/317 |
| 2008/0032276 A1 * | 2/2008 | Zheng | G09B 5/065 | 434/317 |
| 2008/0046818 A1 * | 2/2008 | Orgill | G06F 15/16 | 715/700 |
| 2008/0070216 A1 * | 3/2008 | Becker | G09B 5/062 | 434/317 |
| 2008/0089612 A1 * | 4/2008 | Isomura | H04N 1/387 | 382/295 |
| 2008/0145828 A1 * | 6/2008 | Yu | G09B 5/062 | 434/308 |
| 2008/0254428 A1 * | 10/2008 | Taylor | G09B 5/062 | 434/317 |
| 2008/0267432 A1 * | 10/2008 | Becker | B42D 3/123 | 381/300 |
| 2008/0289230 A1 * | 11/2008 | Mandelbaum | B42D 15/022 | 40/124.01 |
| 2009/0004632 A1 * | 1/2009 | Yau | G09B 21/02 | 434/115 |
| 2009/0102807 A1 * | 4/2009 | Kashiwa | G06F 15/025 | 345/173 |
| 2009/0138357 A1 * | 5/2009 | Riggs | G06Q 30/02 | 705/14.52 |
| 2009/0280461 A1 * | 11/2009 | Kerwick | G09B 5/062 | 434/317 |
| 2010/0026915 A1 * | 2/2010 | Pozin | B42D 1/08 | 348/838 |
| 2010/0033772 A1 * | 2/2010 | Borison | G06T 3/0031 | 358/474 |

(56) References Cited

U.S. PATENT DOCUMENTS

| | | | |
|---|---|---|---|
| 2010/0052934 A1* | 3/2010 | Clegg | B42D 15/022 340/815.4 |
| 2010/0119999 A1* | 5/2010 | Hollywood-Tuck | G09B 23/28 434/96 |
| 2010/0164836 A1* | 7/2010 | Liberatore | G06F 1/1616 345/1.1 |
| 2010/0187802 A1* | 7/2010 | Katzman | B42F 5/00 281/22 |
| 2010/0223824 A1* | 9/2010 | Mandelbaum | B42D 15/022 40/463 |
| 2010/0225809 A1* | 9/2010 | Connors | G06F 15/0283 348/500 |
| 2010/0250255 A1* | 9/2010 | Stern | H04N 1/00188 704/272 |
| 2010/0277443 A1* | 11/2010 | Yamazaki | G06F 1/1616 345/204 |
| 2011/0233272 A1* | 9/2011 | Yau | B42D 1/007 235/375 |
| 2011/0246888 A1* | 10/2011 | Drucker | G06F 1/1626 715/716 |
| 2011/0247247 A1* | 10/2011 | Mayer | B42D 15/022 40/124.03 |
| 2011/0298345 A1* | 12/2011 | Shortt | A45C 11/00 312/237 |
| 2011/0304130 A1* | 12/2011 | Leu | B42D 3/12 281/15.1 |
| 2012/0089938 A1* | 4/2012 | Homma | G06F 3/0485 715/776 |
| 2012/0147042 A1* | 6/2012 | Shinomoto | G02B 27/017 345/633 |
| 2012/0264088 A1* | 10/2012 | Livne | G09B 19/00 434/100 |
| 2013/0002543 A1* | 1/2013 | Yau | B42D 3/123 345/156 |
| 2013/0007601 A1* | 1/2013 | Grams | G06T 11/60 715/247 |
| 2013/0015079 A1* | 1/2013 | Arzoumanian | A45C 11/16 206/6.1 |
| 2013/0050776 A1* | 2/2013 | Yau | G09B 5/062 358/474 |
| 2013/0073932 A1* | 3/2013 | Migos | G06F 15/0291 715/201 |
| 2013/0124980 A1* | 5/2013 | Hudson | G06F 17/21 715/243 |
| 2013/0130216 A1* | 5/2013 | Morton | G09B 5/062 434/317 |
| 2013/0283157 A1* | 10/2013 | Ebata | G06T 11/60 715/265 |
| 2013/0316321 A1* | 11/2013 | Herz | G09B 5/06 434/317 |
| 2014/0033139 A1* | 1/2014 | Ichikawa | G06F 3/04883 715/863 |
| 2014/0049560 A1* | 2/2014 | Campbell | G06T 11/60 345/633 |
| 2014/0200897 A1* | 7/2014 | Stern | B42D 3/123 704/272 |
| 2014/0327660 A1* | 11/2014 | Maloney | G06Q 20/14 345/179 |
| 2016/0059146 A1* | 3/2016 | Javidan | A63H 33/38 446/147 |
| 2016/0059609 A1* | 3/2016 | Javidan | B42D 1/007 446/150 |
| 2016/0063875 A1* | 3/2016 | Javidan | G09B 5/062 434/317 |
| 2016/0063876 A1* | 3/2016 | Javidan | G09B 5/062 434/317 |
| 2016/0063877 A1* | 3/2016 | Javidan | G09B 5/065 434/317 |
| 2016/0140388 A1* | 5/2016 | Ichikawa | G06F 3/04883 348/143 |
| 2016/0148517 A1* | 5/2016 | Bujsaim | G09B 5/02 434/365 |

OTHER PUBLICATIONS

Wolff, WIPO/DE publication No. 000029909017, 1999.*

* cited by examiner

INTERACTIVE BOOK WITH INTEGRATED ELECTRONIC DEVICE

RELATED APPLICATION

The present application relates to and claims the benefit of priority to U.S. Provisional Patent Application No. 61/766,653 filed Feb. 19, 2013, which is hereby incorporated by reference in its entirety for all purposes as if fully set forth herein.

BACKGROUND OF THE INVENTION

1. Field of the Invention

Embodiments of the present invention relate, in general, to an interactive reading device and more particularly to a system that integrates an electronic device within a tactile book to enhance the reading experience.

2. Relevant Background

For ages, books have provided a wealth of information. In 1440, the invention of the Gutenberg printing press revolutionized books. The printed word exploded the exchange of information by producing relatively inexpensive books on paper, as opposed to hand written text on parchment. This infamous idea sparked an information age where other people besides clergy and wealthy could afford and/or gain access to print books. The introduction of electronic publishing may indeed be a similar revolution.

Electronic books continue to change the publishing industry. Internet bookstores, manufactures of e-readers and more all have high hopes for the publishing digital revolution. Electronic books rest on the technical developments and sophistication of reading devices to provide an experience similar to that of reading an actual book enhanced with technological advances. At the same time the increasing penetration of the Internet enables users to change their reading patterns and reading behavior easily. So what is to become of the traditional paper book?

Reading a book continues to be one of the most popular leisure-time occupations throughout the world. Indeed reading a book ranks higher as a leisure activity than using the Internet, going to a movie, playing a video game and the like. Books remain a big business and while it is fair to say electronic books are here to stay it is generally accepted that traditional books will remain part of our lifestyle. Who cannot relate to the comment, "There's something about curling up with a good book in one's hands that can't be beat."

Electronic books (e-books) are digital versions of printed books, which are typically distributed through the Internet. An electronic book reader promises a comfortable computer-free experience for reading. Interestingly, electronic readers attempt to emulate the printed book reading experience, and then act to enhance that experience by offering an easy and wide selection of titles and attempt to expand the reader's experience. E-books can provide a user with hundreds or even thousands of books from which to choose. And buying a new book is simply a click away. And, they are increasingly portable.

Yet paper books have their advantages as well. They are, foremost, tangible. And a book provides a tactile sense of accomplishment when the mass of the book moves from the right side to the left. And not insignificantly paper books provide a hands-on experience.

One important consideration is that experts worry devices such as e-books can distance children from the real world. If they're only exposed to e-readers, children lose the tactile experience of handling a traditional book, turning its pages, or sharing their experiences and favorites with friends.

One important and seemingly universal role of a parent is bonding with a child over a book. Cuddling with a parent or gathering around the teacher for story-time helps kids associate reading with nurturing. These reading experiences can set the stage for later reading success. It is unclear if e-books can provide the same experience and research suggests that parents and teachers find that when using an e-book they often become more controlling, concentrating more on what their child is doing with the device instead of focusing on the story.

Yet e-books also seem to offer some significant advantages with respect to children. While add-ons can distract, some features of e-books are extremely useful for beginning readers. For example, a reader can zoom in on unfamiliar words or click links that help make connections to their world. And when children see printed words light up as they sound out the words, they appear more encouraged to continue with the reading experience. Yet with the increasing interest in e-books and electronic forms of publishing consumers still subscribe to a print book model.

These two forms of media, paper vs. electronic, continue to evolve and it is extremely rare to find an interaction between a traditional book format and its electronic cousin. There remains, therefore, a need for a system, device and/or methodology to bridge the gap between e-books, e-readers, electronic publishing and traditional forms of printed publications. This need is no more evident than within the scope of children's books in which the introduction and formative development of the reading process occurs. The present invention, as described below, provides a system by which electronic forms of media are merged with traditional print books to provide an enhanced reader/user experience.

Additional advantages and novel features of this invention shall be set forth in part in the description that follows, and in part will become apparent to those skilled in the art upon examination of the following specification or may be learned by the practice of the invention. The advantages of the invention may be realized and attained by means of the instrumentalities, combinations, compositions, and methods particularly pointed out in the appended claims.

SUMMARY OF THE INVENTION

A system for the integration of print and electronic media is hereafter presented by way of example. In one embodiment of the present invention such a system can include an electronic media device having a display operable to render an image and a paged media collection (also referred to herein as a book). One aspect of the present invention is that several of the pages within the book include an area void of material. This open area is aligned with the display of the electronic device so as to integrate content presented on the printed pages with content rendered on the display of the electronic device.

Other features of the present invention can include instructions on the printed page for interfacing with the electronic device. These instructions can result in imagery or content displayed on the device that is uniquely linked to one of the plurality of pages. To align images rendered on the display with content on the plurality of pages the paged media is logically linked to the electronic display device. Moreover the content presented on the display device is synchronized with the content presented on each page so as to make each combined page/device experience unique. By doing so, and according to another embodiment the printed pages can include one portion of a story and the electronic media device can include another part of the story so that when combined within the paged media collection they can join to form the compete story.

According to another embodiment of the present invention a hybrid media apparatus for integrating print and electronic media includes a plurality of pages compiled in a book format and an electronic device having a display. Within the electronic device exists software that can be configured to present digital content stored on the device so as to be displayed as an integrated portion of the pages.

A method for integrating page and electronic media in a hybrid apparatus is also described below. According to the present invention, such a method comprises combining several pages into a book wherein a portion of the pages includes a cut out void of material. Within the book is an attachment device operable to secure an electronic device in the book so that images displayed on the electronic device integrate with the content presented on the printed page.

The features and advantages described in this disclosure and in the following detailed description are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

BRIEF DESCRIPTION OF THE DRAWINGS

The aforementioned and other features and objects of the present invention and the manner of attaining them will become more apparent, and the invention itself will be best understood, by reference to the following description of one or more embodiments taken in conjunction with the accompanying drawings, wherein.

Figure 1:
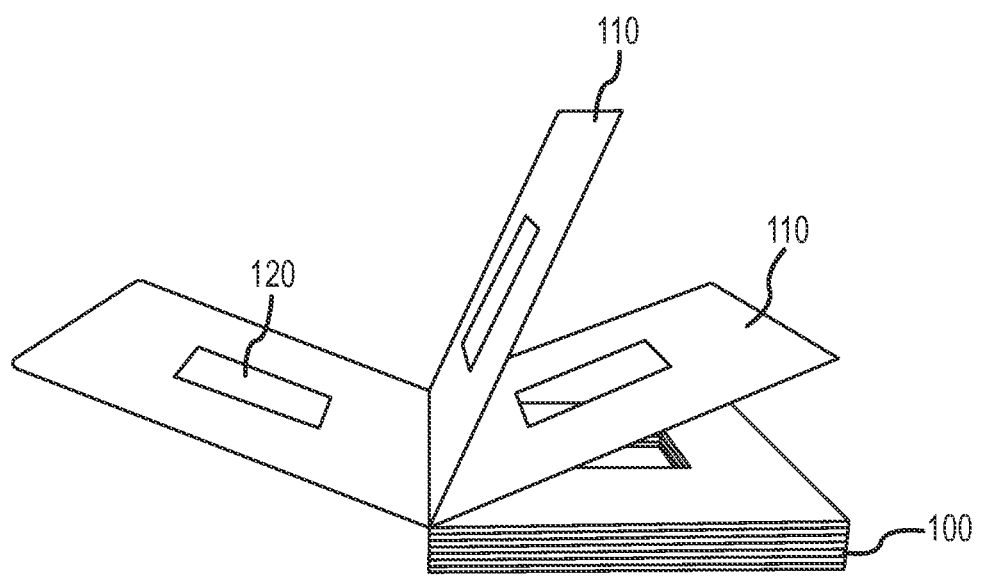
FIG. 1 shows a perspective view of a system for the integration of print and electronic media according to one embodiment of the present invention.

The Figures depict embodiments of the present invention for purposes of illustration only. One skilled in the art will readily recognize from the following discussion that alternative embodiments of the structures and methods illustrated herein may be employed without departing from the principles of the invention described herein.

DESCRIPTION OF THE INVENTION

Disclosed by way of example is a system, device and associated methodology for integrating electronic and print media to provide an enhanced reader/user experience. According to one embodiment of the presentment invention a collection of paged material (a book) is configured to accept an electronic device having a display that can render an image or digital content. The pages within the collection include a void or cut out region in which the display of the electronic device can integrate with the content presented on the page. By doing so, the story presented by the book is enriched by offering both the advantages of a tactile printed manuscript and the sophistication and technological achievements featured in current electronic devices.

According to one embodiment of the present invention, a collection of paged and printed material, which is configured to accept an electronic device, is directed to a particular theme or story. The story contained within the printed material is by itself incomplete. Similarly, the digital content contained within the electronic device, if rendered, would be incomplete or out of context. The present invention combines these two forms of rendered content to craft a complete and/or enhanced story.

In other implementations the story can be presented on the printed pages and enhanced with images or similar digital content on the electronic device. Alternatively the electronic device can provide text that interacts with the images present on the page. One skilled in the art will recognize that any possible combination of text and imagery on the printed pages or display is contemplated by the present invention.

Each page within the collection of paged and printed material within the book includes a cut out section in which the display of an electronic device can be seen. The compilation of paged material includes a means by which the electronic device can be secured so as to align its display with the area on each page void of material. In such a manner the content rendered on the display can integrate with the content printed on each page.

Prior to, or shortly after, coupling the electronic device to the compilation of paged material, digital content complementary with the content rendered on the printed pages is uploaded to the electronic device. Using a software application or instructions suitable for execution on a machine such as a processor, digital content complementary to the content presented on the printed material can be rendered on the display.

As the user or reader interacts with the printed material on each page the content on the display of the electronic device can change. Indeed the content on the printed page can include instructions telling the user or reader how to interact with the electronic display to provide the needed content. The renderings on the display can be synchronized with each printed page and, in one embodiment, automatically advance to the next rendering upon the user moving to the next printed page.

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Like numbers refer to like elements throughout. In the figures, the sizes of certain lines, layers, components, elements or features may be exaggerated for clarity.

The terminology used herein is for the purpose of describing particular embodiments only and is not intended to be limiting of the invention. As used herein, the singular forms "a," "an" and "the" are intended to include the plural forms as well, unless the context clearly indicates otherwise. Thus, for example, reference to "a component surface" includes reference to one or more of such surfaces.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be also understood that when an element is referred to as being "on," "attached" to, "connected" to, "coupled" with, "contacting", "mounted" etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under," "below," "lower," "over," "upper" and the like, may be used herein for ease of description to describe one element or feature's relationship to another element(s) or feature(s) as illustrated in the figures. It will be understood that the spatially relative terms are intended to encompass different orientations of a device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of "over" and "under". The device may be otherwise oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only unless specifically indicated otherwise.

FIG. 1 presents a perspective view of one embodiment of a system for integrating print and electronic media according to the present invention. As shown in FIG. 1 a compilation of paged media 100 is combined into a book format in which a portion of the pages 110 includes an area 120 void of material (a cut out) in which, when aligned, the display of an electronic device (not shown) can be seen.

The origination, size and shape of the area void of material can vary based on the implementation of the present invention and can include rectangular, oval, circular, abstract, irregular and similar shapes. In one embodiment of the present invention, the electronic device is coupled to the compilation 100 near the back or rear of the book. The void areas of several pages thus coincide to enable the display of the electronic device to be used for a plurality of pages. In one embodiment, the area void of material is consistent for each page while in other s the opening may vary to enhance the experience conveyed to the user. For example earlier pages may possess a more narrow filled of view and additional print material that gradually grows to offer additional integration of the electronic media as the story unfolds. In other instances, the opening can be consistent and in yet others the printed page itself may alter the opening to present a specific environment in which the content of the electronic display integrates with that of the printed page.

Figure 2A:
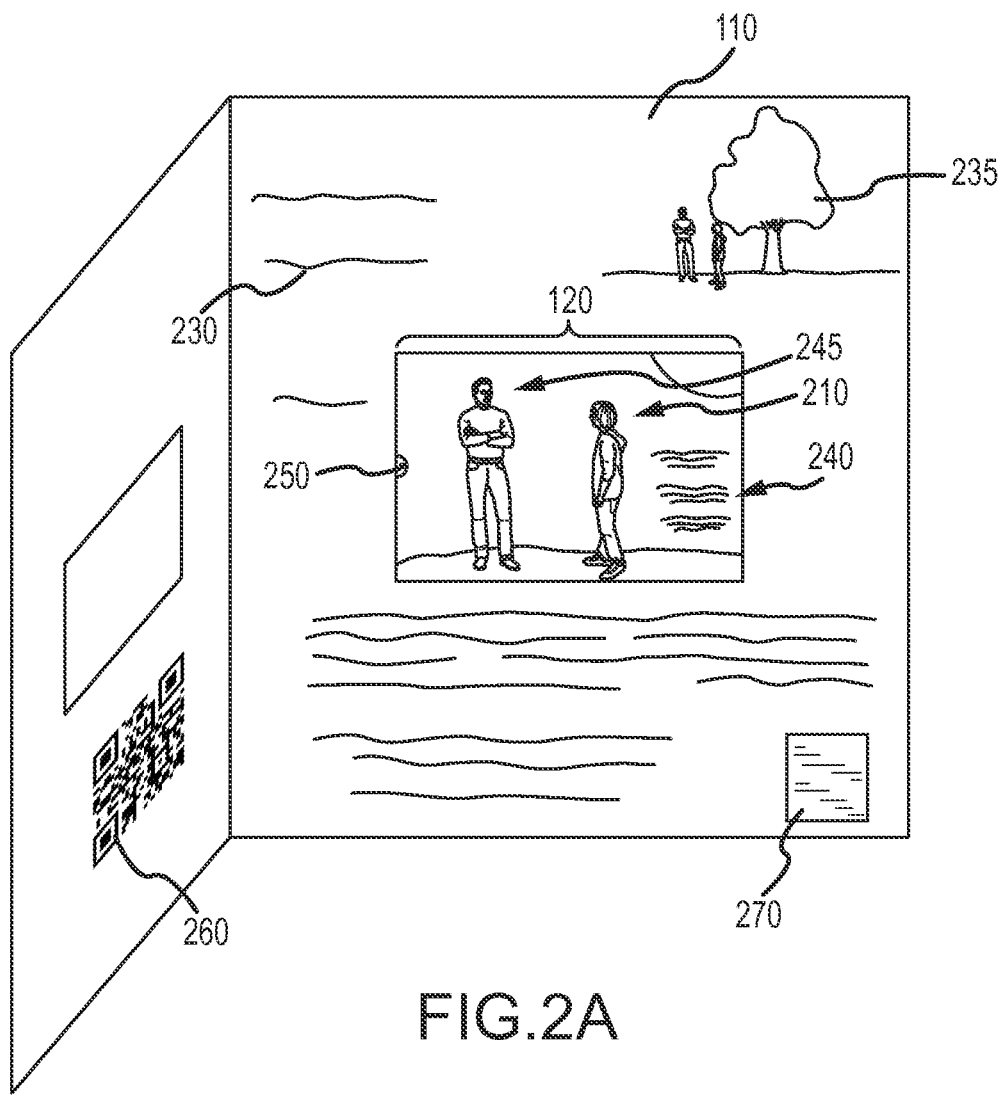
FIG. 2A is a top view of a singular page of a compilation of pages with an integrated electronic device, according to one embodiment of the present invention.

FIG. 2A presents a top view of one page incorporated into a system for integration of print and electronic media according to the present invention. FIG. 2A acts to represent a general rendition of a page of printed material 110 integrated with a display 210 of an electronic device. In this case, an opening 120 in the printed page 110 is substantially centered within the confines of the page. In other embodiments, the electronic device and thus display 210 may be offset, irregular or skewed. The page 110 includes, in this example, a combination of text 230 and imagery 235. Similarly the image rendered by the display 210 includes text 240 and imagery 245. One aspect of the present invention is to integrate the story conveyed on the printed page 110 with the content rendered on the display 210. In this example, the story may present a discussion about a family on a hike and present additional information on the display about changing weather conditions. In another example the printed page can discuss letters of the alphabet and the display gives phonetic examples. If, for example, this page discusses the letter A, the display can show an image of an apple, anchor, or the like.

Figure 2B:
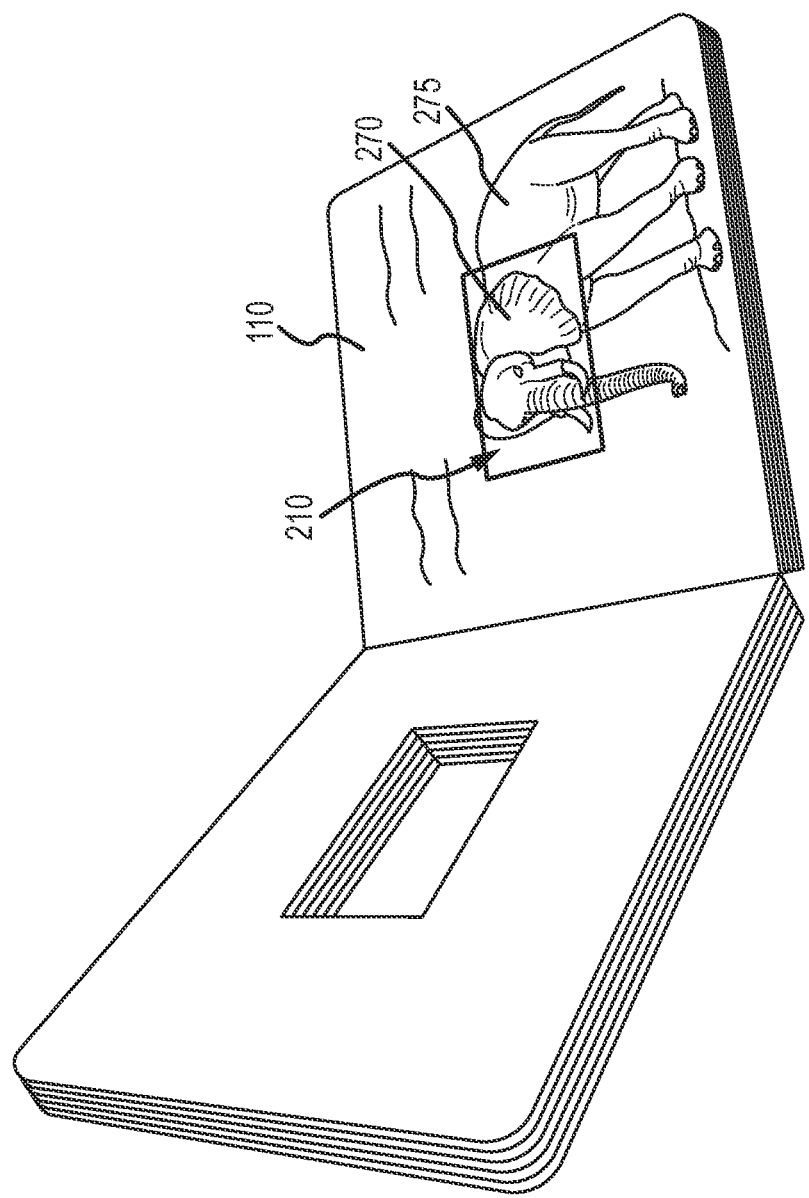
FIG. 2B is a perspective view of a system for the integration of print and electronic media according to one embodiment of the present invention showing the integration and completion of an image rendered by both the printed page and the electronic device.

In other embodiments of the present invention the images present on the page are integrated with images present on the display of the electronic device. FIG. 2B presents an additional rendition of a printed page integrated with a display of an electronic device according to the present invention. As before an electronic device is integrated within the compilation of paged material such that its display 210 is aligned with a cutout region in a printed page 110. In this example a partial image of an animal 275 is presented on the printed page. It is, by itself, incomplete. The display 210, once synchronized with the printed page 110, presents a complementary image 270 of the animal, that when combined with that presented on the page, completes the entire rendition of the animal. Once of reasonable skill in the relevant art will appreciate that the various combinations can occur between the display of the electronic device and the printed page. Combinations of text and imagery can be manifested to as to provide the user with an enhanced experience. For example, in other embodiments, text can be presented that completes a thought or sentence initiated on the printed page. And in other embodiments the interaction and integration of that presented on the electronic device can vary based on inputs from the reader and based on differing instructions present on the page.

In instances in which the display integrates a touch-screen capability, instructions on the page can direct the user to touch a portion of the image to change the display so as to be complementary with the story. For example, the story presented on a particular page may discuss waterfalls of the world and then direct the user to interact with the display to see photographs of several famous waterfalls or provide a short video of a waterfall to again, enhance the experience.

Certain implementations of the present invention rely on user interaction to synchronize the content, of the printed page with that of the display while other embodiments employ technology to autonomously synchronize the content rendered on the display with that of the print material.

According to one embodiment of the present invention an application resident on electronic device utilizes an embedded forward facing camera 250 to scan for a matrix barcode 260 or similar rendering on the rear portion of the prior page. Such a barcode is an optical label that contains information or instructions to synchronize the printed page 110 with the content rendered on the display 210. In such an implementation the electronic device would be coupled to the book and a program initiated that includes engaging the camera in a scan mode. As a page is turned the camera will recognize the optical barcode 260 and direct the image on the display be synchronized with the current page.

Similarly and according to another embodiment of the present invention, an electronic device 270 can be embedded within the page such as an RFID tag or the like. As the tag senses motion though an electromagnetic field generated by the electronic device, it can transmit a signal that is ultimately received and interpreted by the electronic device. Each tag can be linked to a particular page and coded with instructions such that upon being triggered the instructions sent to and received by the electronic device result in the synchronization of the printed page and the content displayed on the electronic device.

Another aspect of the present invention is its ability to integrate printed material on a wide variety of electronic devices that can provide an interactive user experience. According to one embodiment of the present invention a compilation of pages, formed into a book, includes a plurality of pages that each possess a region void of material. This cut out or void region is aligned with a display of an electronic device coupled to or integrated with the book. In one implementation of the present invention a false bottom or cavity within the rear portion of the book is configured to accommodate and secure the electronic device so as to align its display with the cut out/voided region.

Figure 3:
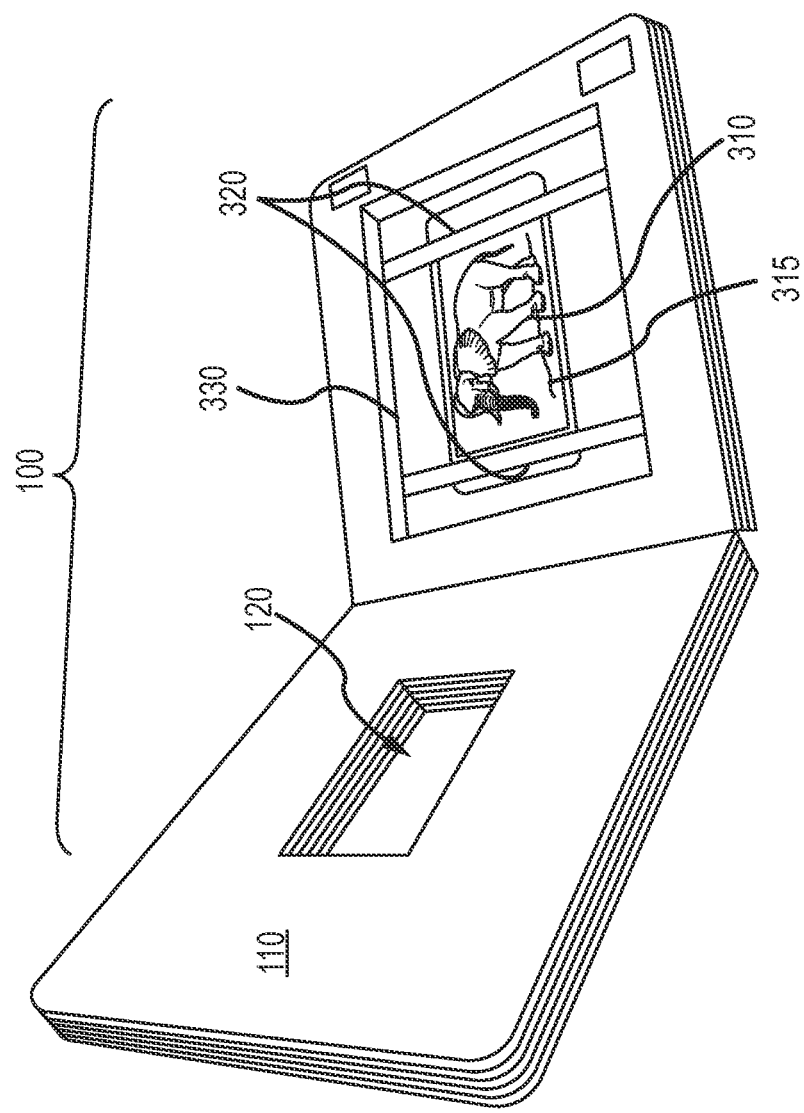
FIG. 3 is a high level perspective drawing of a system, of the present invention, for the integration of print and electronic media showing the coupling of an electronic device with associated printed material.

FIG. 3 presents a perspective view of one embodiment of a system for integrating print and electronic media having a cavity by which to secure an electronic device. As shown in FIG. 3, the book 100 includes a plurality of pages 110 which each contains a region 120 void of material. This cut out region is aligned with a display 310 of an electronic device 315 secured in a cavity 330 of the book 100. In the exemplary embodiment shown in FIG. 3 the electronic device 315 is secured to the book 110 by two elastic straps 320 that couple the electronic device to the book 100 and align its display 310 to that of the cut out region 120.

Although the invention has been and is described and illustrated with a certain degree of particularity, it is understood that the present disclosure has been made only by way of example and that numerous changes in the combination and arrangement of parts can be resorted to by those skilled in the art without departing from the spirit and scope of the invention. Accordingly, while the electronic device 315 of FIG. 3 is secured to the book 100 by two elastic straps in other embodiments the electronic device 315 can be secured by a hook and loop connection or by similar means. Moreover the device can be coupled to the book using clamps or a form sized to accommodate a specific type of electronic device. As one of reasonable skill in the relevant art of the present invention is contemplated to accommodate a wide variety of electronic devices with varying dimensional characteristics. One means by which to increase the probability that the display will be properly aligned with the cutout region is to configure the cavity 330 in which the electronic device rests in an angular, concave manner to aid in centering the device.

Another feature of the present invention is the ability to electronically modify the usable rendering (screen size) of content on the display to match that of the voided area. According to one embodiment of the present invention, an application resident on the electronic device and suitable for providing digital content on the display for integration with printed content further possesses the ability to dimensionally modify the viewing area of the display to be sized consistent the voided area on each page. Many electronic devices possess displays that are larger than the voided area and therefore without scaling the display region much of the content may be hidden behind portions of the page. The present invention enables a user to calibrate the display so as to match with cut out region on each printed page. In other embodiments in which the electronic device and page are synchronized the scale of the display may vary. On some pages the screen may be small while on others large. And in yet others only a portion of the screen, off center, may be identified as being integrated with the printed content.

The present invention contemplates being compatible with a wide range of electronic devices having interactive displays. While many devices possess similar capabilities with respect to offering vivid graphics and user interface options, there are no standard display sizes. One aspect of the present invention is to accept displays resident on multiple platforms. As previously mentioned, one means by which to accommodate multiple devices is to enable the user to calibrate the size of the screen manually so as to match the cut out area on each page. According to another embodiment of the present invention, the book can possess a unique identifier that includes data with respect to the size and shape of the openings in the book or provides the means to gain such data from a server. With a particular electronic device coupled to the book, the application resident on the electronic device can be initiated. During this process the content associated with the book will be identified on the device, or, as described herein, be downloaded from a server. Included within that information can be information regarding the characteristics of the cutout regions on each page. Similarly, the application, can, based on the type of electronic device, automatically calibrate its display so as comply with the physical constraints resident in that particular book. The server, can, in one embodiment, possess information regarding multiple platforms so as to provide calibration information for each particular instance. Moreover, if an electronic device, unknown to the server, is associated with the book and its screen calibrated manually as previously described, that information can be uploaded to the server along with a electronic device identifier to supplement the current database for other users should that same type of device be used again by a different user.

Figure 4:
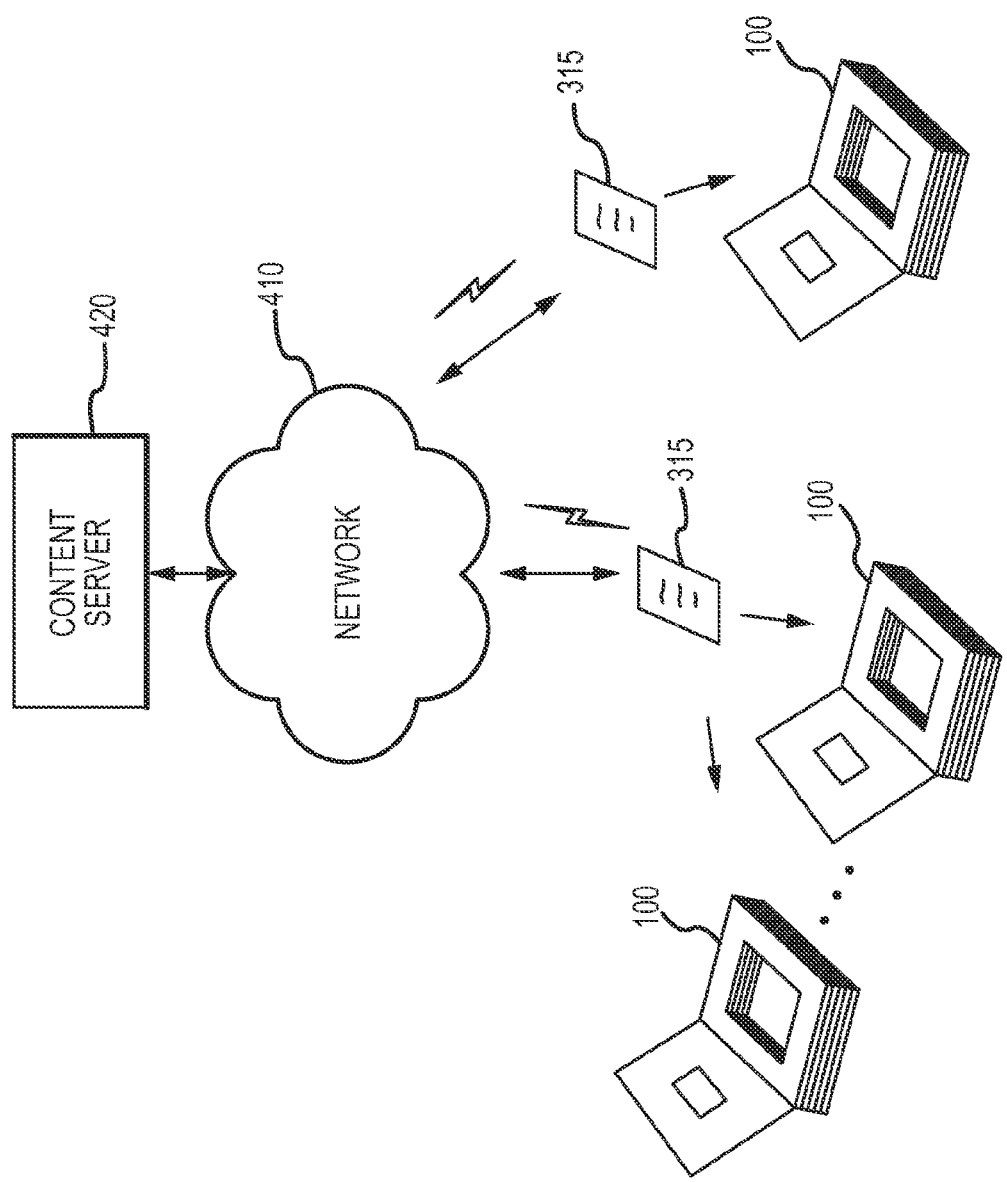
FIG. 4 is a high level block diagram of a network environment suitable for implementation of a system for the integration of print and electronic media according to one embodiment of the present invention.

FIG. 4 shows a high-level block diagram of a system for integration printed and electronic media according to one embodiment of the present invention. A compilation of printed material 100 can be joined with an electronic device 315 as previously described. The electronic device 315 can, in another embodiment, be communicatively coupled with a server 420, computer or similar device via a network 410 such as the Internet, intranet, or a local area network. That device 420 can provide the electronic device with content suitable for the particular printed material 100 integrated with the electronic device 315. In such a scenario content hosed in the server 420 can be downloaded (delivered) to the electronic device for later use and incorporation or served to the electronic device continuously (streamed). Regardless, the electronic device 315 gains the necessary digital content to enhance the user's reading experience with an integrated electronic and print media device.

Included in the description are flowcharts depicting examples of the methodology that may be used to integrate page and electronic media in a hybrid apparatus. In the following description, it will be understood that each block of the flowchart illustrations, and combinations of blocks in the flowchart illustrations, can be implemented by computer program instructions. These computer program instructions may be loaded onto a computer or other programmable apparatus to produce a machine such that the instructions that executes on the computer or other programmable apparatus create means for implementing the functions specified in the flowchart block or blocks. These computer program instructions may also be stored in a computer-readable memory that can direct a computer or other programmable apparatus to function in a particular manner such that the instructions stored in the computer-readable memory produce an article of manufacture including instruction means that implement the function specified in the flowchart block or blocks. The computer program instructions may also be loaded onto a computer or other programmable apparatus to cause a series of operational steps to be performed in the computer or on the other programmable apparatus to produce a computer implemented process such that the instructions that execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems that perform the specified functions or steps, or combinations of special purpose hardware and computer instructions.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve the manipulation of information elements. Typically, but not necessarily, such elements may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," "words", or the like. These specific words, however, are merely convenient labels and are to be associated with appropriate information elements.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

Figure 5:
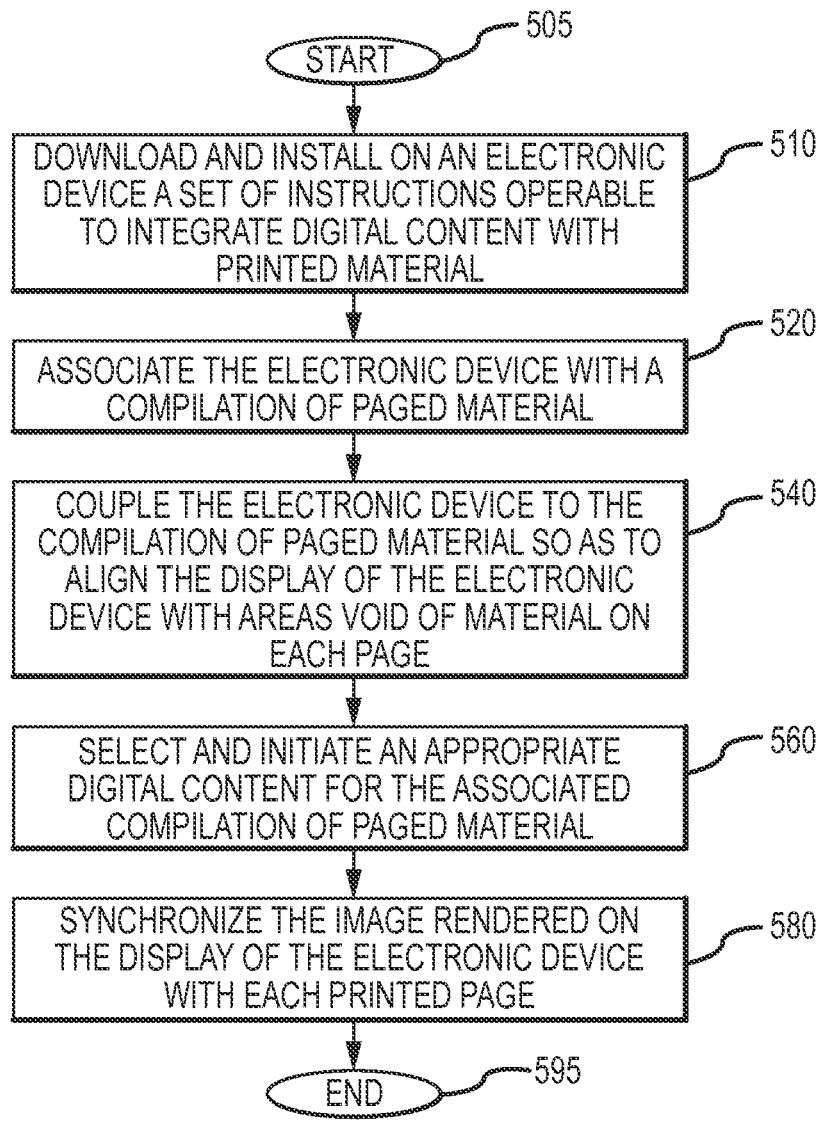
FIG. 5 is a flowchart of one method embodiment of the present invention for a process of integrating print and electronic media.

FIG. 5 presents a flowchart of one method embodiment, according to the present invention, for integration of content associated with printed material and digital content rendered on the display of an electronic device. The process begins 505 with downloading 510, by an electronic device, a set of instructions operable to integrate digital content displayed on the device with content presented in printed form in a book. A user can, as instructed in the printed material or otherwise informed, seek out and identify an application or digital content suitable for the electronic device that will interface with the book. Once downloaded and installed the user can associate 520 the electronic device with compilation of page material on which printed content exists designed to be integrated with digital content. The installed application can thereafter seek out and install new digital content from a web server or similar digital repository.

With the application installed and digital content either present in the electronic device or available for real-time streaming, the electronic device can be coupled 540 to the compilation of paged material so as to align the display of the electronic device with areas in the pages void of material. By doing so the display of the electronic device can integrate with the printed content on each page. Once coupled the downloaded application is selected and initiated 560 so as to associate with each page an appropriate rendering of digital content. The rendered digital content could comprise text, imagery, music, video or any combination thereof.

As each page is turned the application synchronizes 580 the rendering on the display with the content presented on the printed page so as to form a cohesive and enhanced reading experience for the user. As each page is turned the rendering on the display changes (either manually or autonomously) until the story is complete, ending 595 the process.

Embodiments of the present invention describe a system, device and methodology for integrating traditional printed material with an electronic media. A plurality of pages compiled into a book forms a vessel by which an electronic device such as mobile phone or table is integrated. The pages are configured to possess a cutout region through which the display of the electronic device can be seen. A program on the device presents digital content associated with the printed material that enhances the user's/reader's experience.

While prior exemplary embodiments of the present invention have addressed integration of an electronic device with printed material to craft a story or convey a message, such as a book for a child, another aspect of the present invention is the integration of paged and electronic media in a gaming environment. Electronic games are well known and very popular. One embodiment of the present invention is to provide printed material that integrates with that displayed on the electronic device to provide a unique and enhanced game environment. Each combination of printed book and electronic device can be unique. For example each book may possess a unique code that when communicated to the electronic device, either autonomously or manually, modifies the application on the electronic device. Different content is presented, for example, based on the book in which it is integrated. The differing capabilities can be hosted locally on the machine or remotely on a server.

In other embodiments the books can be customized or further enhanced with additional elements such as cards, stickers or the like. In doing so these new components can also have additional codes that when input into the electronic device unlock or reveal new capabilities.

The aforementioned discussion with respect to gaming options of the present invention can be implemented as a sole user or in a multiuser environment. In the situation of a multiuser environment the game environment developed by combining a particular book with an electronic device can be uniquely associated with a user identifier. Other users can similarly create a gaming environment and both can be communicatively linked via a network such as the Internet. In such a manner user initiating a gaming environment of a book combined with an electronic device can establish a multi-user game on-line environment, but one wherein each user's individual game environment is unique and personalized.

It will be understood by those familiar with the art, that the invention may be embodied in other specific forms without departing from the spirit or essential characteristics thereof. Likewise, the particular naming and division of the modules, managers, functions, systems, engines, layers, features, attributes, methodologies, and other aspects are not mandatory or significant, and the mechanisms that implement the invention or its features may have different names, divisions, and/or formats. Furthermore, as will be apparent to one of ordinary skill in the relevant art, the modules, managers, functions, systems, engines, layers, features, attributes, methodologies, and other aspects of the invention can be implemented as software, hardware, firmware, or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

In a preferred embodiment, portions of the present invention can be implemented in software. Software programming code that embodies the present invention is typically accessed by a microprocessor from long-term, persistent storage media of some type, such as a flash drive or hard drive. The software programming code may be embodied on any of a variety of known media for use with a data processing system, such as a diskette, hard drive, CD-ROM, or the like. The code may be distributed on such media, or may be distributed from the memory or storage of one computer system over a network of some type to other computer systems for use by such other systems. Alternatively, the programming code may be embodied in the memory of the device and accessed by a microprocessor using an internal bus. The techniques and methods for embodying software programming code in memory, on physical media, and/or distributing software code via networks are well known and will not be further discussed herein.

Generally, program (software) modules include routines, programs, objects, components, data structures and the like that perform particular tasks or implement particular abstract data types. Moreover, those skilled in the art will appreciate that the invention can be practiced with other computer system configurations, including hand-held devices, multi-processor systems, microprocessor-based or programmable consumer electronics, and the like. The invention may also be practiced in distributed computing environments where tasks are performed by remote processing devices that are linked through a communications network. In a distributed computing environment, program modules may be located in both local and remote memory storage devices.

Embodiments of the present invention as have been herein described may be implemented with reference to various wireless networks and their associated communication devices. Networks can also include mainframe computers or servers, such as a gateway computer or application server (which may access a data repository). A gateway computer serves as a point of entry into each network. The gateway may be coupled to another network by means of a communications link. The gateway may also be directly coupled to one or more devices using a communications link. Further, the gateway may be indirectly coupled to one or more devices. The gateway computer may also be coupled to a storage device such as data repository.

An implementation of the present invention may also be executed in a Web environment, where software installation packages are downloaded using a protocol such as the Hypertext Transfer Protocol (HTTP) from a Web server to one or more target computers (devices, objects) that are connected through the Internet. Alternatively, an implementation of the present invention may be executing in other non-Web networking environments (using the Internet, a corporate intranet or extranet, or any other network) where software packages are distributed for installation using techniques such as Remote Method Invocation ("RMI") or Common Object Request Broker Architecture ("CORBA").

While there have been described above the principles of the present invention in conjunction with a system for the integration of print and electronic media, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features that are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived therefrom.

I claim:

1. A system for the integration of print and electronic media, the system comprising:
    an electronic media device wherein the electronic media device includes a display operable to render an image;
    a paged media collection wherein the paged media collection includes a front cover and a back cover and interposed between the front cover and the back cover are one or more pages and wherein the one or more pages includes an area void of material configured through which to view the display of the electronic media device and a unique identifier wherein a size of the area void of material is included in the unique identifier and wherein a viewing area of the display of the electronic device is sized to match the area void of material identified by the unique identifier, and wherein each of the one or more pages includes a first fixed portion of an item and wherein the electronic media device displays, for each page, one of a plurality of versions of a second portion of the item based on the first fixed portion of the item on that page and wherein the first fixed portion of the item and the second portion of the item are, individually, incomplete and wherein when combined within the paged media collection the second portion of the items join the first fixed portion of the item to form one version of a complete form of the item; and
    an attachment mechanism operable to removably couple a plurality of electronic media devices including the electronic media device to the paged media collection so as to integrate the display of the electronic media device with the area void of material of the one or more pages.

2. The system for the integration of print and electronic media according to claim 1, wherein the one or more pages includes instructions for interfacing with the electronic media device.

3. The system for the integration of print and electronic media according to claim 1, wherein the image rendered on the display is uniquely linked to one of the one or more pages.

4. The system for the integration of print and electronic media according to claim 1, wherein the image rendered on the display is based on instructions included on at least one the one or more pages.

5. The system for the integration of print and electronic media according to claim 1, wherein the size of the area void of material included in the unique identifier can be gained from a server.

6. The system for the integration of print and electronic media according to claim 1, wherein the paged media collection includes a paged media identifier that when combined with the electronic media device uniquely binds the electronic device to the paged media.

7. The system for the integration of print and electronic media according to claim 1, wherein the paged media collection includes print media.

8. The system for the integration of print and electronic media according to claim 1, wherein the first fixed portion is printed on the one or more pages.

9. The system for the integration of print and electronic media according to claim 1, wherein the display of the electronic media device integrates with printed material on each of the one or more pages to convey the complete form of the item to a user.

10. The system for the integration of print and electronic media according to claim 1, wherein the paged media collection is communicatively linked to the electronic media device so as to align images rendered on the display with the first fixed portion of the item on each of the one or more pages.

11. The system for the integration of print and electronic media according to claim 1, wherein the paged media collection includes instructions directing the electronic media device to communicatively link with a second electronic device for digital content associated with the paged media collection.

12. The system for the integration of print and electronic media according to claim 1, wherein the electronic media device is selected from a group consisting of a tablet computer, a smart phone, and a personal data assistant.

13. The system for the integration of print and electronic media according to claim 1, wherein the electronic media device includes instructions operable to render an image on the display based on each of the one or more pages.

14. The system for the integration of print and electronic media according to claim 1, wherein the item is a story.

15. A hybrid media apparatus for integrating print and electronic media, comprising:
    one or more pages interposed between a front cover and a back covered compiled in a book format wherein a portion of each of the one or more pages includes a display zone void of material and a unique identifier wherein a size of the display zone void of material is included in the unique identifier; and
    one of a plurality of removable electronic devices associated with the one or more pages having a display viewable through the display zone wherein a viewing area of the display of the electronic device is sized to match the display zone identified by the unique identifier, a storage medium operable to store digital content, a machine capable of executing instructions embodied as software, and a plurality of software portions, wherein one of said software portions is configured to present digital content stored in the storage medium based on instructions printed on each of the one or more of the one or more pages and wherein each of the one or more pages includes a first fixed portion of an item and wherein the electronic device displays for each page one of a plurality of versions of a second portion of the item based on the first fixed portion on that page and wherein the first portion of the item and the second portion of the item are, individually, incomplete yet when combined within the paged media collection the first fixed portion of the item and the second portion of the item displayed on the electronic device form one version of a compete form of the item.

16. The hybrid media apparatus for integrating print and electronic media according to claim 15, wherein the item is a story.

17. The hybrid media apparatus for integrating print and electronic media according to claim 15, further comprising an attachment device coupled to the one or more pages operable to secure the removable electronic device so as to align the display with the display zone.

18. The hybrid media apparatus for integrating print and electronic media according to claim 15, wherein the removable electronic device is communicatively coupled to a server and configured to request digital content based association of the plurality of pages with the electronic device.

19. The hybrid media apparatus for integrating print and electronic media according to claim 15, wherein the removable electronic device is selected from a group consisting of a smartphone, a tablet computer, and a personal data assistant.

20. The hybrid media apparatus for integrating print and electronic media according to claim 15, wherein digital content is selected from the group consisting of images, text, music, and videos.

21. A method for integrating page and electronic media in a hybrid apparatus, the method comprising:

combining a one or more pages into a book format having a front cover and a back cover wherein a portion of the one or more pages includes a display zone void of material and a unique identifier wherein a size of the display zone void of material is included in the unique identifier;

coupling to the one or more pages an attachment device operable to secure one of a plurality of removable electronic devices wherein the electronic device includes a display operable to present digital content and wherein a viewing area of the display of the electronic device is sized to match the display zone identified by the unique identifier, and wherein the attachment device is configured to align the display with the display zone; and presenting an item wherein each of the one or more pages includes a first fixed portion of the item and wherein the removable electronic device displays on the display one of a plurality of versions of a second portion of the item based on the first fixed portion on each of the one or more pages and wherein the first fixed portion of the item and the second portion of the item are, individually, incomplete and wherein when combined within the paged media collection the first fixed portion of the item and the second portion of the item form one version of a complete form of the item.

22. The method for integrating page and electronic media according to claim 21, wherein the item is a story.

23. The method for integrating page and electronic media according to claim 21, wherein the removable electronic device requests digital content from a server based association of the one or more pages with the electronic device.

24. The method for integrating page and electronic media according to claim 21, further comprising rendering the image on the removable electronic device based on instructions printed on the one or more pages.

25. The method for integrating page and electronic media according to claim 21, wherein digital content is selected from the group consisting of images, text, music, and videos.

* * * * *